United States Patent
Huber et al.

(10) Patent No.: US 9,604,690 B2
(45) Date of Patent: Mar. 28, 2017

(54) BICYCLE FRAME WITH COUPLING DEVICE TO PERMIT FLEXING

(71) Applicants: Chris Huber, Carson City, NV (US); Michael Huber, Livermore, CA (US)

(72) Inventors: Chris Huber, Carson City, NV (US); Michael Huber, Livermore, CA (US)

(*) Notice: Subject to any disclaimer, the term of this patent is extended or adjusted under 35 U.S.C. 154(b) by 149 days.

(21) Appl. No.: 14/216,572

(22) Filed: Mar. 17, 2014

(65) Prior Publication Data

US 2014/0265406 A1    Sep. 18, 2014

Related U.S. Application Data

(60) Provisional application No. 61/788,914, filed on Mar. 15, 2013.

(51) Int. Cl.
| | |
|---|---|
| *B62K 19/36* | (2006.01) |
| *B62K 3/04* | (2006.01) |
| *B62K 19/18* | (2006.01) |
| *B62K 25/04* | (2006.01) |

(52) U.S. Cl.
CPC ............ *B62K 19/36* (2013.01); *B62K 3/04* (2013.01); *B62K 19/18* (2013.01); *B62K 2025/041* (2013.01); *B62K 2700/32* (2013.01)

(58) Field of Classification Search
CPC ... B62K 3/02; B62K 3/04; B62K 3/10; B62K 19/00; B62K 19/04; B62K 19/06; B62K 19/18; B62K 19/30; B62K 2700/00; B62K 2700/20; B62K 2700/32
See application file for complete search history.

(56) References Cited

U.S. PATENT DOCUMENTS

| | | | | |
|---|---|---|---|---|
| 424,870 A | * | 4/1890 | Fay | B62K 3/005 |
| | | | | 280/261 |
| 470,317 A | * | 3/1892 | Burton | B62K 25/04 |
| | | | | 280/283 |
| 527,404 A | * | 10/1894 | Byrne | A63G 19/00 |
| | | | | 280/227 |
| 687,216 A | * | 11/1901 | Foreman | B62K 25/04 |
| | | | | 280/283 |
| 699,376 A | * | 5/1902 | Errick | B62K 25/04 |
| | | | | 280/283 |
| 4,669,747 A | * | 6/1987 | Groendal | B62K 3/02 |
| | | | | 280/283 |
| 4,792,150 A | * | 12/1988 | Groendal | B62K 3/02 |
| | | | | 280/275 |

(Continued)

FOREIGN PATENT DOCUMENTS

| | | |
|---|---|---|
| DE | 202007014551 U1 | 3/2009 |
| EP | 2052957 A2 | 4/2009 |

(Continued)

OTHER PUBLICATIONS

International Preliminary Report of Patentability for PCT/US2014/030445 dated Sep. 15, 2015.

(Continued)

*Primary Examiner* — Kevin Hurley
(74) *Attorney, Agent, or Firm* — Marshall, Gerstein & Borun LLP

(57) ABSTRACT

A bicycle frame includes a seat tube and a top tube. A coupling device flexibly couples the top tube to the seat tube.

30 Claims, 9 Drawing Sheets

(56) References Cited

U.S. PATENT DOCUMENTS

| | | | | |
|---|---|---|---|---|
| 4,838,569 A * | 6/1989 | Ford | ............................ | B62J 1/06 |
| | | | | 280/275 |
| 5,269,551 A * | 12/1993 | Martin | .................... | B62K 19/30 |
| | | | | 264/258 |
| 5,330,219 A * | 7/1994 | Groendal | ............. | B62K 15/006 |
| | | | | 280/275 |
| 5,445,400 A * | 8/1995 | Martin | .................... | B62K 19/16 |
| | | | | 280/281.1 |
| 5,456,482 A * | 10/1995 | Rau, III | .................... | B62K 3/04 |
| | | | | 280/283 |
| 5,725,225 A * | 3/1998 | Lai | .......................... | B62K 25/30 |
| | | | | 280/275 |
| 5,785,339 A * | 7/1998 | Mamiya | .................. | B62K 25/28 |
| | | | | 280/283 |
| 5,833,258 A * | 11/1998 | Maestripieri | .......... | B62K 25/04 |
| | | | | 280/275 |
| 7,533,895 B2 * | 5/2009 | Beal | ........................ | B62K 25/04 |
| | | | | 280/276 |
| 8,540,267 B1 | 9/2013 | Chubbuck et al. | | |
| 2008/0088113 A1 * | 4/2008 | Menayan | .................. | B62K 3/04 |
| | | | | 280/287 |
| 2012/0169028 A1 * | 7/2012 | Lund | ....................... | B62K 19/18 |
| | | | | 280/281.1 |
| 2013/0270793 A1 * | 10/2013 | Pomerantz | ................. | B60R 9/10 |
| | | | | 280/287 |
| 2013/0292920 A1 * | 11/2013 | Alan | .......................... | B62J 1/08 |
| | | | | 280/274 |

FOREIGN PATENT DOCUMENTS

| | | |
|---|---|---|
| EP | 2474465 A1 | 7/2012 |
| FR | 1062770 A | 4/1954 |
| NL | 85644 C | 2/1957 |
| WO | WO-2008063140 A1 | 5/2008 |
| WO | WO-2012101336 A1 | 8/2012 |

OTHER PUBLICATIONS

Search Report for International Application No. PCT/US2014/030445, dated Dec. 5, 2014.

Written Opinion for International Application No. PCT/US2014/030445, dated Dec. 5, 2014.

* cited by examiner

BICYCLE FRAME WITH COUPLING DEVICE TO PERMIT FLEXING

CROSS-REFERENCE TO RELATED APPLICATION

This application claims the benefit of U.S. Provisional Patent Application No. 61/788,914, entitled "Bicycle Frame with Coupling Device to Permit Flexing," filed on Mar. 15, 2013, which is incorporated by reference herein in its entirety.

FIELD OF TECHNOLOGY

The present disclosure relates generally to bicycles, and more particularly to bicycle frames configured to isolate the rider from shocks due to surface irregularities.

BACKGROUND

The primary structural component of a bicycle is the frame. Typically the bicycle frame comprises multiple tubes (a top tube and a down tube) that are rigidly secured to and extend between a head tube and a seat tube of a bicycle. The head tube provides a structural base to which the front wheel fork and handlebars are attached. The seat tube typically provides a base for a seat post which is normally telescopically received into the seat tube at a first end of the seat tube, and a saddle of the bicycle is secured to the seat post. A second end of the seat tube is rigidly attached to a bottom bracket, and the down tube is also rigidly attached to the bottom bracket. The top tube extends frontwardly from an upper end of the seat tube to the front tube.

Additionally, first ends of first and second chain stay members are rigidly attached to the bottom bracket and extend from the bottom bracket rearwardly. Additionally, first ends of first and second seat stay members are rigidly attached to the upper end of the seat tube. The first and second seat stay members and extend rearwardly and downwardly from the upper end of the seat tube, and second ends of the first and second seat stay members are rigidly attached to the second ends of the first and second chain stay members.

Typically the frame components discussed above are welded, brazed or bonded into a single rigid structure.

When a rider is on a bicycle having a rigid frame as discussed above, shocks due to surface irregularities are communicated through the frame to the seat and handle bars, causing discomfort and making it harder for the rider to pedal effectively. There have been many attempts to design bicycle frames that reduce shocks. For example, some bicycle frames incorporate suspension systems designed to absorb road shocks.

SUMMARY OF THE DISCLOSURE

In some embodiments, a bicycle frame includes a seat tube and a top tube. A coupling device is configured to flexibly couple the top tube to the seat tube. In some embodiments, the coupling device is additionally or alternatively configured to flexibly couple the seat stays to the seat tube. In some embodiments, the coupling device is configured to permit relative movement between (i) the top tube and/or the seat stays, and (ii) the seat tube. In some embodiments, the seat stays are integral with the top tube to form an integral crossbar tube, and the coupling device couples the crossbar tube flexibly to the seat tube.

In some embodiments, the coupling device is configured to provide more lateral and torsional rigidity but more flexibility in multiple other directions. For example, in some embodiments, the coupling device is more rigid with respect to movement of the top tube and/or the seat stays in a direction perpendicular to a vertical plane passing through the top tube and the seat tube, and/or is more rigid with respect to (i) torsional movement of the top tube, with respect to the seat tube, about the lateral axis of the top tube and/or (ii) torsional movement of each seat say, with respect to the seat tube, about a lateral axis of the seat stay, as compared to flexibility with respect to vertical movement of the top tube and/or the seat stays in a direction generally parallel to a lateral axis (e.g., a centerline) of the seat tube.

In some embodiments, the coupling device is configured to permit the top tube to move, relative to the seat tube, in a direction parallel to the lateral axis of the seat tube. In some embodiments, the coupling device is configured to permit the top tube to move, relative to the seat tube, in a direction perpendicular to the lateral axis (e.g., the centerline) of the seat tube and generally parallel to a lateral axis of the top tube. For example, in some embodiments, the coupling device is configured to permit an integral crossbar tube to bow (e.g., flex), relative to the seat tube, in a direction parallel to the lateral axis (e.g., the centerline) of the seat tube.

In some embodiments, the coupling device is configured to permit a trapezoid generally formed by the top tube, a down tube, chain stays, and the seat stays, to compress and expand in a direction along the lateral axis of the seat tube.

In some embodiments, the frame can be approximately modeled as a first leaf spring, comprising the top tube and the seat stays (or the crossbar tube), coupled to a second leaf spring comprising the down tube and the chain stays. The seat tube and coupling device couple the first leaf spring and the second leaf spring together approximately at the center portions of the first leaf spring and the second leaf spring, and the seat tube and coupling device act as a damper. The first leaf spring and the second leaf spring can flex toward one another and release away from one another, with the seat tube and coupling device acting to dampen the motion of the center of the first leaf spring with respect to the center of the second leaf spring.

DETAILED DESCRIPTION

Figure 1A:
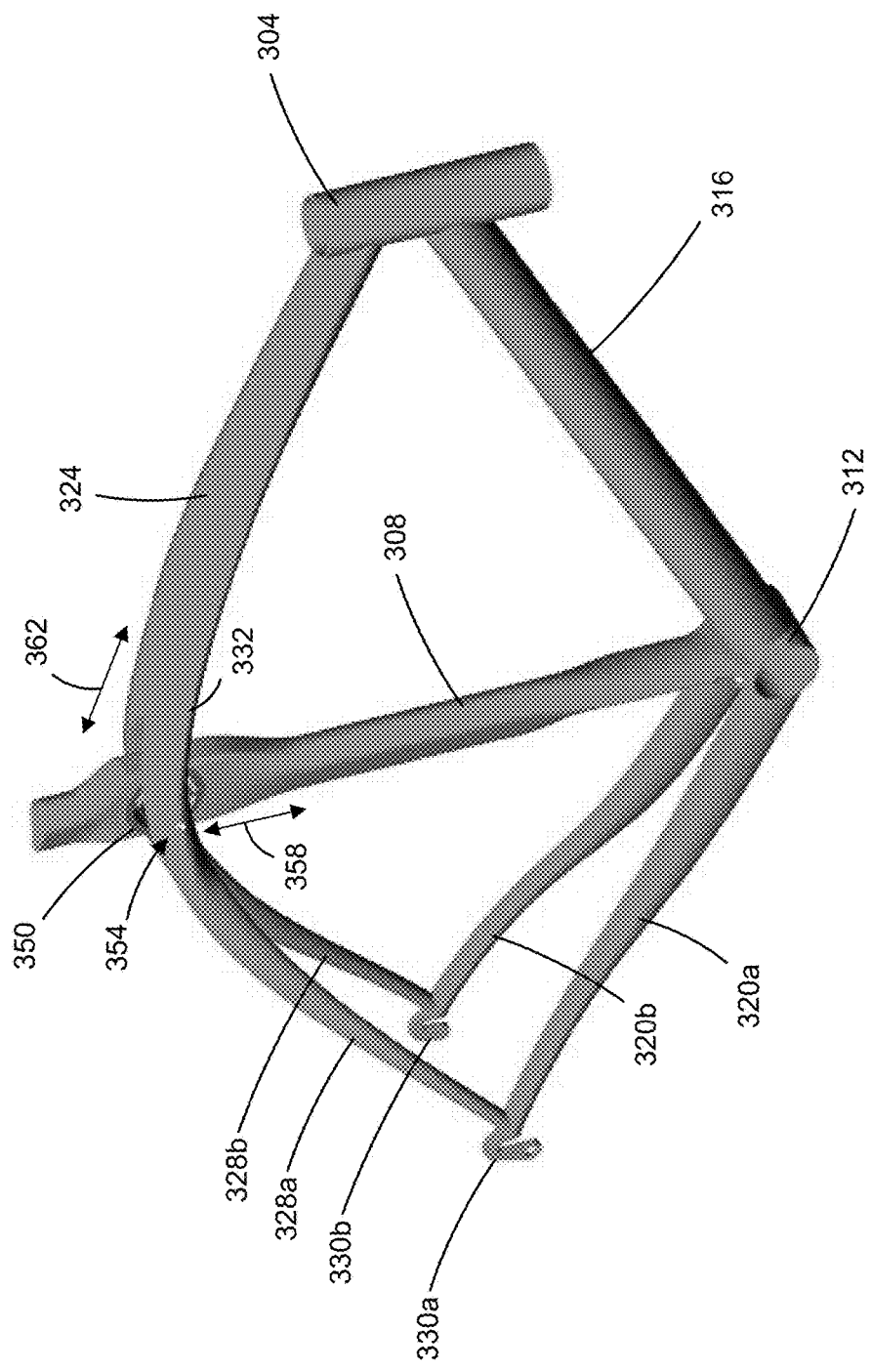
FIG. 1A is an isometric view of a bicycle frame, according to an embodiment.

Embodiments described herein utilize a coupling device configured to couple seat stays flexibly to a seat tube, and/or to couple a top tube flexibly to the seat tube to allow relative movement between the seat stays and the seat tube and/or the top tube and the seat tube. In some embodiments, the seat stays are integral with the top tube to form an integral crossbar tube, and the coupling device couples the crossbar tube flexibly to the seat tube.

In some embodiments, the coupling device is configured to provide more lateral and torsional rigidity but more flexibility in multiple other directions. For example, in some embodiments, the coupling device is more rigid with respect to movement of the top tube and/or the seat stays in a direction perpendicular to a plane passing through a lateral axis of the top tube and a lateral axis of the seat tube, and/or is more rigid with respect to (i) torsional movement of the top tube, with respect to the seat tube, about the lateral axis of the top tube and/or (ii) torsional movement of each seat say, with respect to the seat tube, about a lateral axis of the seat stay, as compared to flexibility with respect to vertical movement of the top tube and/or the seat stays in a direction generally parallel to a lateral axis (e.g., a centerline) of the seat tube.

In some embodiments, the coupling device allows the bicycle frame to flex (e.g., compress and expand) vertically, in a trapezoidal fashion, and thus permit the frame to absorb road shock. For example, in some embodiments, the coupling device permits a trapezoid generally formed by the top tube, a down tube, chain stays, and the seat stays, to compress and expand in a direction along the lateral axis (e.g., a centerline) of the seat tube.

In some embodiments, the coupling device additionally or alternatively facilitates mass damping when the rider is seated. In particular, in such embodiments, vibrations within a frequency range are significantly absorbed by the coupling device when the rider is seated. In some embodiments, damping is provided by the coupling device via a damping mechanism and/or material integral with the coupling device. In some embodiments, the bike frame also provides damping.

In some embodiments, the frame can be approximately modeled as a first leaf spring, comprising the top tube and the seat stays (or the crossbar tube), coupled to a second leaf spring comprising the down tube and the chain stays. The seat tube and coupling device couple the first leaf spring and the second leaf spring together approximately at portions of the first leaf spring and the second leaf spring generally corresponding to maximum bowing and/or deflection between the first leaf spring and the second leaf spring, and the coupling device acts as a spring and/or damper. The first leaf spring and the second leaf spring can flex toward one another and release away from one another, with the coupling device acting as a spring (along with the frame) and/or acting to dampen the motion of the portion of the first leaf spring coupled to the seat tube with respect to the portion of the second leaf spring coupled to the seat tube (and augmenting damping provided by the frame).

FIG. 1A is an isometric view of an example bicycle frame 300, according to an embodiment. The frame 300 includes a head tube 304, a seat tube 308, a bottom bracket shell 312, a down tube 316, chain stays 320, a top tube 324, and seat stays 328. The top tube 324 is integral with the seat stays 328 to form an integral crossbar tube 332, in an embodiment. An end of the top tube 324 is attached to the head tube 304 by welding, brazing, bonding, or any other suitable technique. A first end of the down tube 316 is attached to the head tube 304 by welding, brazing, bonding, or any other suitable technique. A second end of the down tube 316 is attached to the bottom bracket shell 312 by welding, brazing, bonding, or any other suitable technique.

In an embodiment, a first end of the seat tube 308 is removably coupled to the bottom bracket shell 312 by one or more bolts, a bearing, one or more pins, or any other suitable technique.

Respective first ends of the chain stays 320 are attached to the bottom bracket shell 312 by welding, brazing, bonding, or any other suitable technique. Respective second ends of the chain stays 320 are attached to respective ends of the seat stays 328 by welding, brazing, bonding, or any other suitable technique. At or proximate to the junctions of the respective second ends of the chain stays 130 with the respective ends of the seat stays 128, respective brackets 330a may be integrally formed with, or attached to (e.g., by welding, brazing, bonding, or any other suitable technique), the respective second ends of the chain stays 320 and/or the respective ends of the seat stays 328. The brackets 330 are configured to receive an axle of a rear wheel, in an embodiment.

The coupling device 350 is mounted within an opening in the seat tube 308 proximate to a second end of the seat tube 308. The coupling device 350 is also attached to the crossbar tube 332 proximate to a junction of the top tube 324 with the seat stays 328 using any suitable attachment mechanism 354. In an embodiment one or more bolts 354 are utilizes to attach the coupling device 350 to the crossbar tube 332. In an embodiment, the one or more bolts 354 permit rotational movement between the crossbar tube 332 and the flexure device 350. In another embodiment, the one or more bolts 354 inhibit rotational movement between the crossbar tube 332 and the flexure device 350. In an embodiment, the crossbar tube 332 is connected to the flexure device 350 via at least four bolts (two on each side) to inhibit rotational movement. In an embodiment, the attachment mechanism 354 comprises one or more tabs. In an embodiment, the attachment mechanism 354 comprises one or more bosses.

The head tube 304, the seat tube 308, the bottom bracket shell 312, the down tube 316, the chain stays 320, the seat stays 328, and the crossbar tube 332 each may comprise a suitable material such as steel, aluminum alloy, titanium, carbon fiber, etc.

Figure 1B:
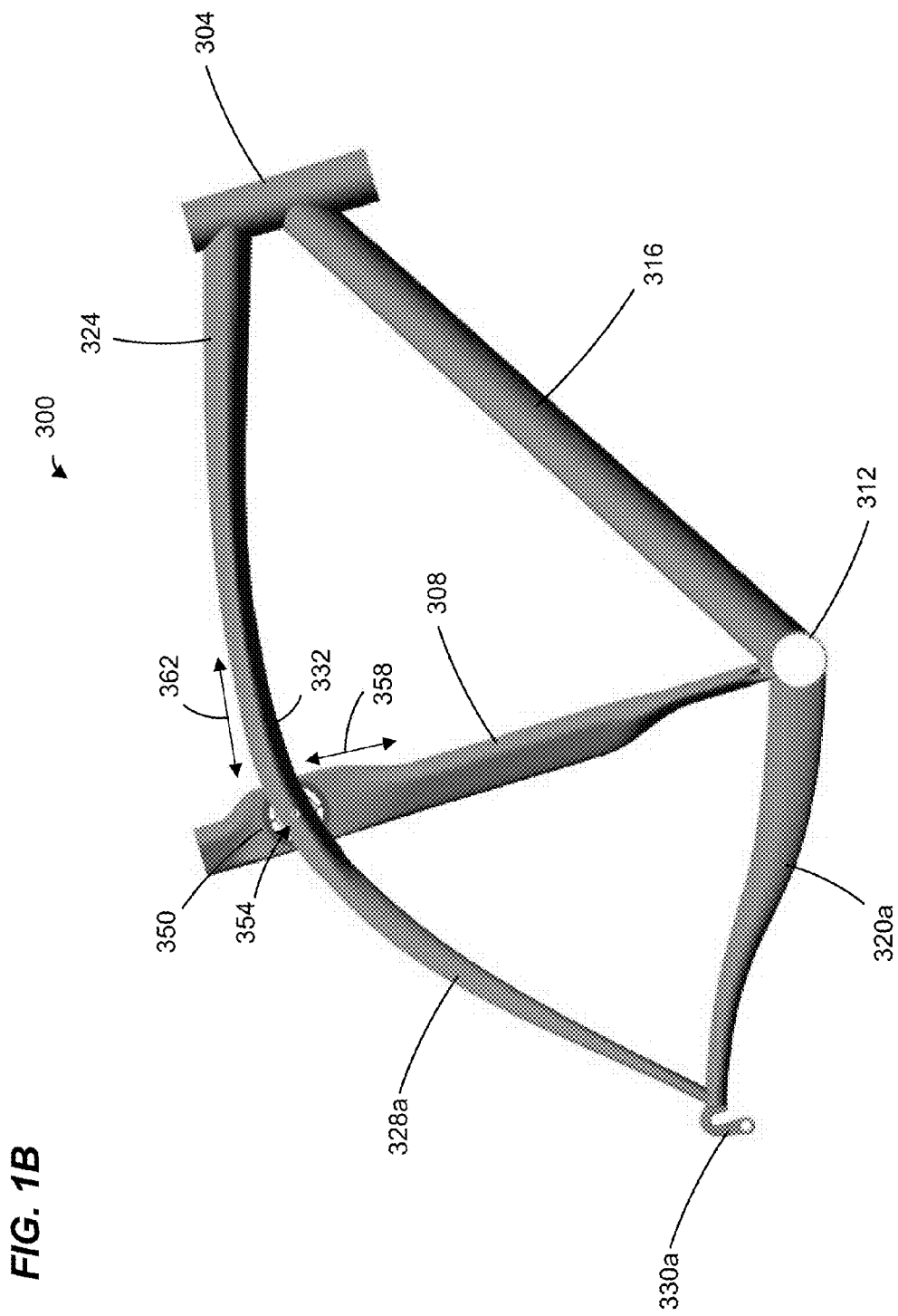
FIG. 1B is a side view of the bicycle frame of FIG. 1A, according to an embodiment.

FIG. 1B is a side view of the frame 300 of FIG. 1A.

Figure 1C:
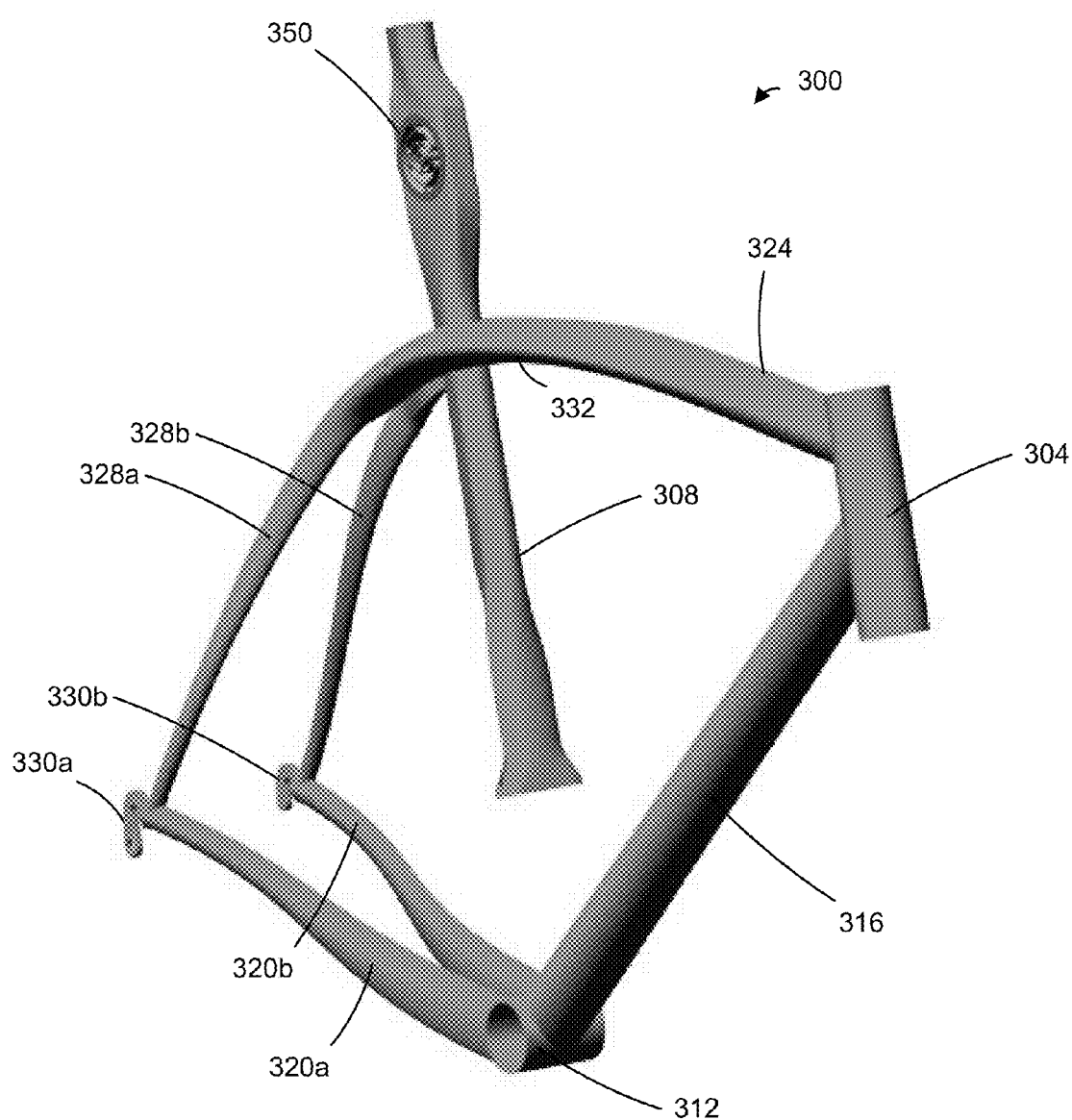
FIG. 1C is an isometric view of the bicycle frame of FIG. 1A with a detached seat tube, according to an embodiment.

FIG. 1C is an isometric view of the frame 300 of FIG. 1A, with the seat tube 308 detached from the bottom bracket shell 312.

The coupling device 350 is a flexure device, in an embodiment. The flexure device 350 is described in more detail below. The flexure device 350 is configured to couple the crossbar tube 332 to the seat tube 308, and to be more rigid with respect to relative movement of the crossbar tube 332 with respect to the seat tube 308 in some directions, but more flexible with respect to relative movement of the crossbar tube 332 with respect to the seat tube 308 in other directions. In particular, the flexure device 350 is more rigid with respect to movement of the crossbar tube 332 in a direction perpendicular to a plane passing through a lateral axis of the top tube 324 and a lateral axis of the seat tube 308, and/or more is rigid with respect to (i) torsional movement of the crossbar tube 332, with respect to the seat tube 308, about the lateral axis of the top tube 308.

Referring to FIGS. 1A and 1B, the flexure device 350 is configured to permit the crossbar tube 332 to move, relative to the seat tube 308, in a direction (indicated in FIGS. 1A and 1B by the arrows 358) parallel to the lateral axis of the seat tube 308. Additionally, the flexure device 350 is configured to permit the crossbar tube 332 to move, relative to the seat tube 308, in a direction (indicated in FIGS. 1A and 1B by the arrows 362) perpendicular to the lateral axis of the seat tube 308 and generally parallel to the lateral axis of the top tube 324.

Further, the flexure device 350, because of the flexibility in certain directions described above, allows the bicycle frame 300 to flex vertically, in a trapezoidal fashion, and thus permit the frame 300 to absorb road shock. For example, the flexure device 350 permits a trapezoid generally formed by the top tube 324, the down tube 316, the chain stays 324, and the seat stays 328, to compress and expand (e.g., bow and flex) in a direction (indicated in FIGS. 1A and 1B by the arrows 358) parallel to the lateral axis of the seat tube 308.

In some embodiments, the frame 300 can be approximately modeled as a first leaf spring, comprising the crossbar tube 332, coupled to a second leaf spring comprising the down tube 316 and the chain stays 320. The first leaf spring and the second leaf spring are coupled together at the head tube 304 and the junction of the seat stays 328 and the chain stays 320. Additionally, the seat tube 308 and the flexure device 350 couple the first leaf spring and the second leaf spring together approximately at portions of the first leaf spring and the second leaf spring generally corresponding to maximum bowing and/or deflection between the first leaf spring and the second leaf spring, and the flexure device 350 act as a spring and/or damper. The first leaf spring and the second leaf spring can flex toward one another and release away from one another (generally in the directions indicated by the arrow 358), with the flexure device 350 acting as a spring (along with the frame) and/or acting to dampen the motion of the portion of the first leaf spring coupled to the seat tube 308 with respect to the portion of the second leaf spring coupled to the seat tube (and augmenting damping provided by the frame 300).

The flexure device 350 is mounted to the seat tube 308 proximate to the second end of the seat tube 308. In an embodiment, the seat tube 308 defines an aperture in which the flexure device 350 is mounted. In an embodiment, the flexure device 350 is held in place within the aperture, at least partially, when the flexure device 350 is also attached to the cross-bar tube 332 with the attachment mechanism 354 (e.g., one or more bolts). In an embodiment, the flexure device 350 may be held in place within the aperture using any suitable mechanism such as one or more bolts, a locking mechanism, etc.

In an embodiment, the aperture has a generally circular shape and the flexure device 350 has a matching circular shape such that the flexure device 350 can be inserted in the aperture. In an embodiment, the aperture has a generally oval shape and the flexure device 350 has a matching oval shape such that the flexure device 350 can be inserted in the aperture. In an embodiment, the aperture has a generally rectangular shape and the flexure device 350 has a matching rectangular shape such that the flexure device 350 can be inserted in the aperture. In another embodiment, the aperture has a polygonal shape and the flexure device 350 has a matching polygonal shape such that the flexure device 350 can be inserted in the aperture.

In an embodiment, the aperture has a spline and the flexure device 350 has a matching spline such that the flexure device 350 is engaged by the spline of the aperture when inserted. In an embodiment, the aperture has a female spline whereas the flexure device 350 has a matching male spline such that the flexure device 350 is engaged by the spline of the aperture when inserted. Similarly, in another embodiment, the aperture has a male spline whereas the flexure device 350 has a matching female spline such that the flexure device 350 is engaged by the spline of the aperture when inserted. In another embodiment, the aperture has polygonal shape and the flexure device 350 has a matching polygonal shape such that the flexure device 350 is engaged by the aperture when inserted.

In an embodiment, the flexure device 350 is removably mounted to the seat tube 308. This permits the flexure device 350 to be easily replaced with other differently configured flexure devices 350 that are designed for different rider weights, road conditions, etc. In other embodiments, the flexure device 350 is more permanently attached to the seat tube 308, such as by welding, brazing, bonding, etc., the flexure device 350 to the seat tube 308. To enable insertion or removal of the flexure device 305, the seat tube 308 can be removed from the bottom bracket 312 as illustrated in FIG. 1C, in an embodiment.

In some embodiments, such as with a circularly shaped aperture and flexure device 350 or a polygonally shaped aperture and flexure device 350, the flexure device 350 can be inserted into the aperture in different orientations. In some embodiments, a single flexure device 350 positioned at different orientations within the aperture provides different spring and/or damping characteristics, and thus allows adjustments for different rider weights, road conditions, riding requirements (e.g., climbing versus riding on flat terrain), etc. In some embodiments, the spring rate and thus the stiffness of a combination spring comprising the frame 300 and the flexure device 350 is directional, e.g., with a direction of maximum deflection depending on the orientation of the flexure device 350 within the aperture. In some embodiments, a displaced shape of the frame 300 (e.g., a shape of the frame 300 when bowed or flexed) will be different depending on the orientation of the flexure device 350 within the aperture. In some embodiments, the different directions of maximum deflection and/or different shapes when bowed/flexed resulting from different orientations of the flexure device 350 within the aperture provide different spring/stiffness responses that a rider can feel; the rider can then tune the response to a desired "feel" (for user preference, changing road conditions, etc.) by changing the orientation of the flexure device 350 within the aperture.

Figure 2:
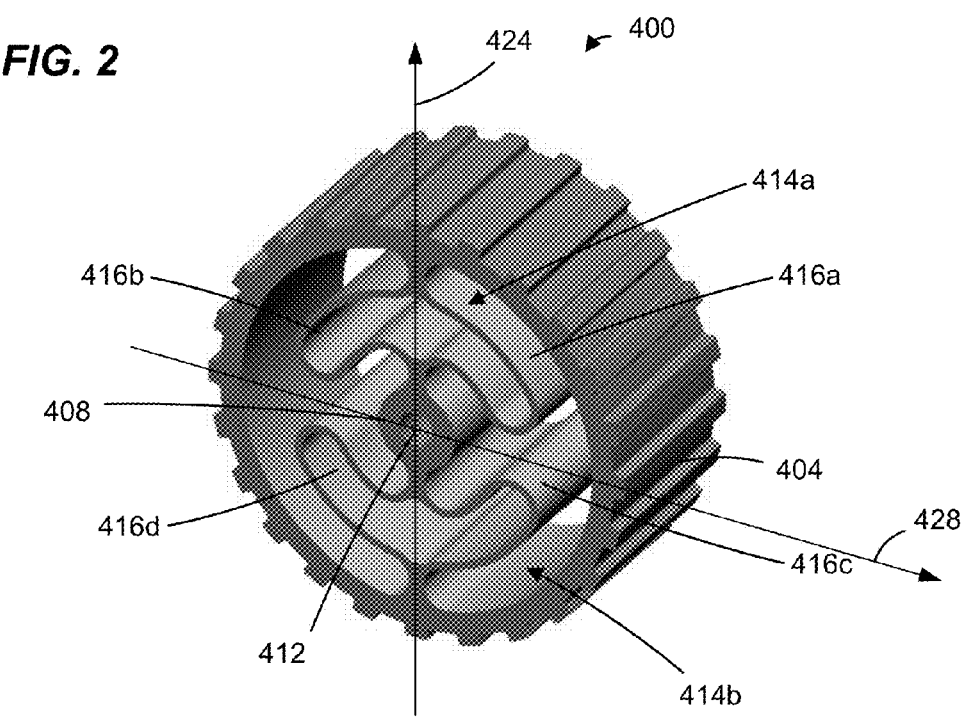
FIG. 2 is an isometric view of an example coupling device, according to an embodiment.

FIG. 2 is an isometric view of an example flexure device 400 that can be utilized as the flexure device 350 with the frame 300 of FIGS. 1A, 1B, and 1C, according to an embodiment. The flexure device 400 includes a first portion 404 configured to fit within a similarly shaped aperture of the seat tube 308, as discussed above. A second portion 408 is configured to attach to the crossbar tube 332. For example, the second portion 408 defines a threaded aperture 412 in which one or more bolts can be inserted, the one or more bolts for attaching the crossbar tube 332 to the second portion 408 of the flexure device 400.

The first portion 404 is flexibly coupled to the second portion 408 via a plurality of flexure members 414. The first portion 404 defines an opening and the second portion 408 is located within the opening. In particular, the plurality of flexure members 414 flexibly couple the first portion 404 to the second portion 408 so that the second portion 408 is located within the opening defined by the first portion 404. In some embodiments, all of the flexure members 414 have the same shape. In some other embodiments, the flexure members 414 have different shapes. In an embodiment, each of at least some of the flexure members comprise multiple flexure elements 416.

An outer portion of the first portion 404 is splined. In an embodiment, the aperture in the seat tube 308 is also splined so that the flexure device 400 cannot rotate within the aperture of the seat tube 308. On the other hand, in some embodiments, the splining of the flexure device 404 and the aperture in the seat tube 308 permits the flexure device 400 to be mounted within the aperture of the seat tube 308 in a plurality of different orientations, and each orientation leads the flexure device 400 to provide a different spring and/or damping characteristic. For example, when the flexure device 400 is mounted within the aperture of the seat tube 308 such that the arrow 424 indicates vertical, the flexure device 400 provides a first spring characteristic, whereas when the flexure device 400 is mounted within the aperture of the seat tube 308 such that the arrow 428 indicates vertical, the flexure device 400 provides a second spring characteristic. In an embodiment, the first spring characteristic corresponds to more rigidity in the vertical direction as compared to the second spring characteristic.

The flexure device 400 may comprise steel, stainless steel, titanium, a fiber-reinforced composite, etc., or any other suitable material, in various embodiments. The flexure device 400 may have elastomeric dampening material co-molded, bonded or inserted into the appropriate areas of the flexure device 400 to further dampen vibrations, in some embodiments. In some embodiments, the flexure device 400 comprises aluminum, plastic, rubber, some combination thereof, and/or combined with some other suitable material. The flexure device 400 may be extruded, molded, etc.

Figure 3:
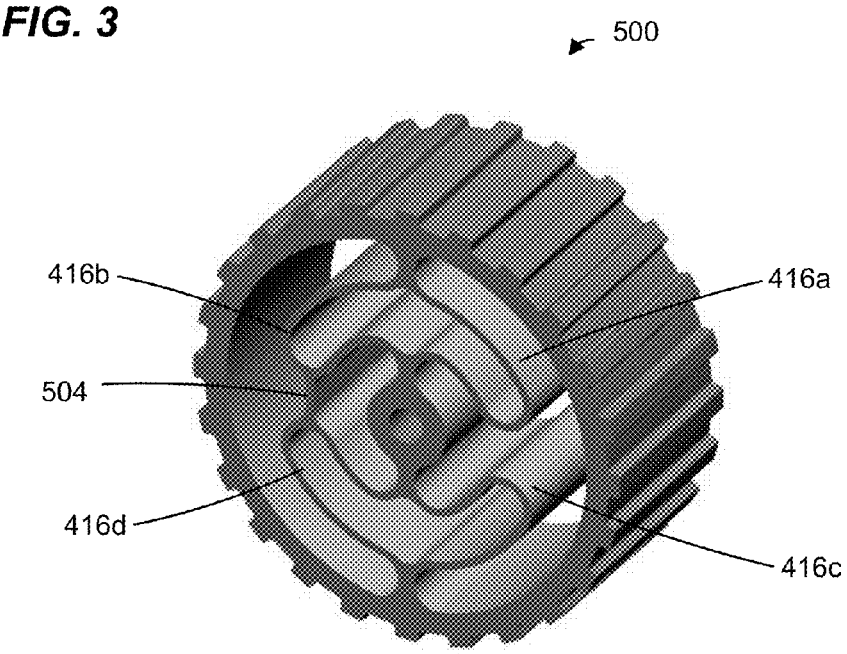
FIG. 3 is an isometric view of another example coupling device, according to another embodiment.

FIG. 3 is an isometric view of another example flexure device 500 that can be utilized as the flexure device 350 with the frame 300 of FIGS. 1A, 1B, and 1C, according to an embodiment. The flexure device 500 is similar to the flexure device 400 of FIG. 2, but includes a flexure element 504 that couples the flexure element 416*b* and the flexure element 416*d*. In an embodiment, the flexure device 500 has asymmetrical stiffness characteristics. In an embodiment, when the flexure device 500 is positioned in the aperture of the frame 300 in different orientations, different spring/stiffness responses are provided. In some embodiments, the spring rate and thus the stiffness of a combination spring comprising the frame 300 and the flexure device 500 is directional, e.g., with a direction of maximum deflection depending on the orientation of the flexure device 500 within the aperture. In some embodiments, a displaced shape of the frame 300 (e.g., a shape of the frame 300 when bowed or flexed) will be different depending on the orientation of the flexure device 500 within the aperture. In some embodiments, the different directions of maximum deflection and/or different shapes when bowed/flexed resulting from different orientations of the flexure device 500 within the aperture provide different spring/stiffness responses that a rider can feel; the rider can then tune the response to a desired "feel" (for user preference, changing road conditions, etc.) by changing the orientation of the flexure device 500 within the aperture.

Figure 4:
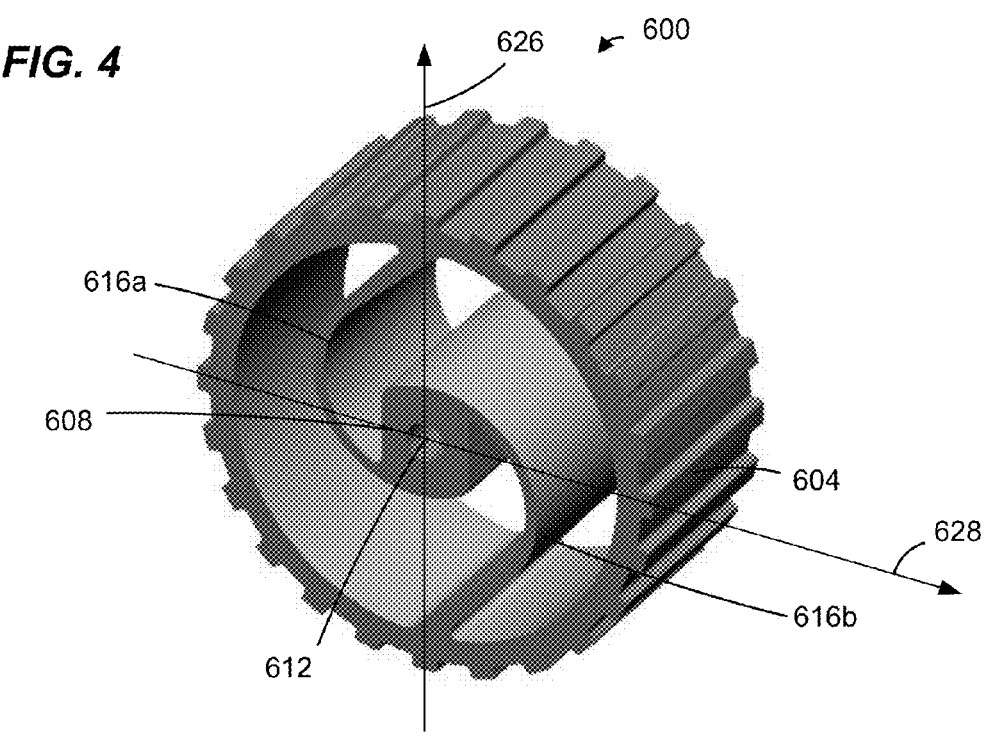
FIG. 4 is an isometric view of another example coupling device, according to another embodiment.

FIG. 4 is an isometric view of another example flexure device 600 that can be utilized as the flexure device 350 with the frame 300 of FIGS. 1A, 1B, and 1C, according to an embodiment. The flexure device 600 includes a first portion 604 configured to fit within a similarly shaped aperture of the seat tube 308, as discussed above. A second portion 608 is configured to attach to the crossbar tube 332. For example, the second portion 608 defines a threaded aperture 612 in which one or more bolts can be inserted, the one or more bolts for attaching the crossbar tube 332 to the second portion 608 of the flexure device 600.

The first portion 604 is flexibly coupled to the second portion 608 via a plurality of flexure members 616. The first portion 604 defines an opening and the second portion 608 is located within the opening. In particular, the plurality of flexure members 616 flexibly couple the first portion 604 to the second portion 608 so that the second portion 608 is located within the opening defined by the first portion 604. In the embodiment of FIG. 4, two flexure members 616 are included. In other embodiments, three, four, five, etc., flexure members 616 are included. In some embodiments, all of the flexure members 616 have the same shape. In some other embodiments, at least some of the flexure members 616 have different shapes.

An outer portion of the first portion 604 is splined. In an embodiment, the aperture in the seat tube 308 is also splined so that the flexure device 600 cannot rotate within the aperture of the seat tube 308. On the other hand, in some embodiments, the splining of the flexure device 604 and the aperture in the seat tube 308 permits the flexure device 600 to be mounted within the aperture of the seat tube 308 in a plurality of different orientations, and each orientation leads the flexure device 600 to provide a different spring and/or damping characteristic. For example, when the flexure device 600 is mounted within the aperture of the seat tube 308 such that the arrow 624 indicates vertical, the flexure device 600 provides a first spring characteristic, whereas when the flexure device 600 is mounted within the aperture of the seat tube 308 such that the arrow 628 indicates vertical, the flexure device 600 provides a second spring characteristic. In an embodiment, the first spring characteristic corresponds to more rigidity in the vertical direction as compared to the second spring characteristic.

Figure 5:
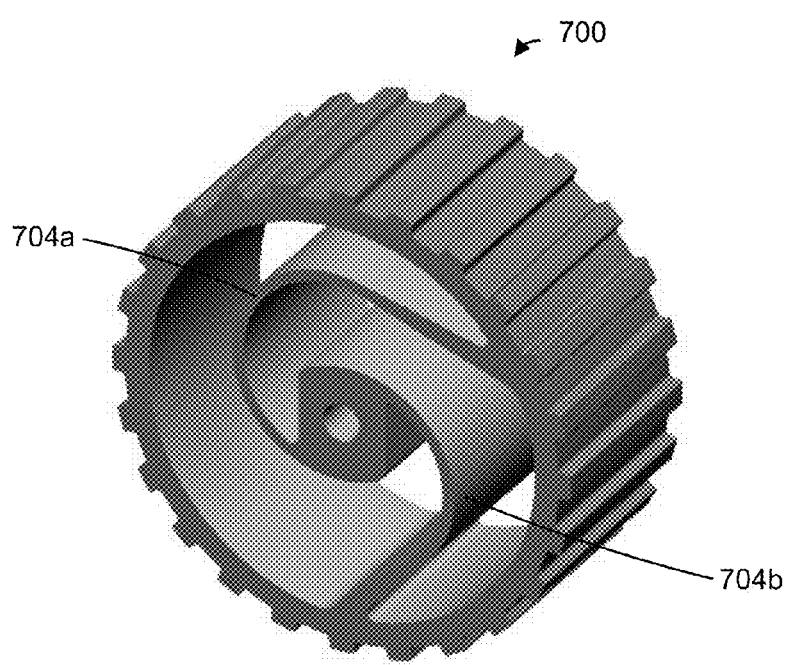
FIG. 5 is an isometric view of another example coupling device, according to another embodiment.

FIG. 5 is an isometric view of another example flexure device 700 that can be utilized as the flexure device 350 with the frame 300 of FIGS. 1A, 1B, and 1C, according to an embodiment. The flexure device 700 is similar to the flexure device 600 of FIG. 4, but includes a flexure member 704*b* that has a different shape than the flexure member 704*a*. In some embodiments, the spring rate and thus the stiffness of a combination spring comprising the frame 300 and the flexure device 700 is directional, e.g., with a direction of maximum deflection depending on the orientation of the flexure device 700 within the aperture. In some embodiments, a displaced shape of the frame 300 (e.g., a shape of the frame 300 when bowed or flexed) will be different depending on the orientation of the flexure device 700 within the aperture. In some embodiments, the different directions of maximum deflection and/or different shapes when bowed/flexed resulting from different orientations of the flexure device 700 within the aperture provide different spring/stiffness responses that a rider can feel; the rider can then tune the response to a desired "feel" (for user preference, changing road conditions, etc.) by changing the orientation of the flexure device 700 within the aperture.

Referring to FIGS. 2-5, in some embodiments, the flexure device 400 and the flexure device 600 each provides generally similar spring/damping characteristics in all orientations, as compared to the flexure device 500 and the flexure device 700.

In other embodiments, the flexure device 400, 500, 600, and/or 700 includes multiple apertures 412, 612 configured for connecting the flexure device 400, 500, 600, and/or 700 to the crossbar tube 332. For example, in some embodiments, the multiple apertures 412, 612 permit connecting the flexure device 400, 500, 600, and/or 700 to the crossbar tube 332 using at least four bolts (two on each side) to inhibit rotational movement of the crossbar tube with respect to the flexure device 400, 500, 600, and/or 700.

In other embodiments, the flexure device 400, 500, 600, and/or 700 includes multiple apertures 412, 612 configured for connecting the flexure device 400, 500, 600, and/or 700 to a top tube 324 and to separate seat stays 328 that are not integral with the top tube 324.

In some embodiments, multiple flexure devices (e.g., two or another suitable number) can be mounted within the aperture in a side-by-side arrangement, for example. In such embodiments, different spring/damping responses are achieved by individually orientating the different flexure devices within the aperture. In an embodiment, a first flexure device primarily functions as a directional spring, and a second flexure device primarily functions as a directional damper; different spring/damping responses are achieved by individually orientating the first flexure device and the second flexure device within the aperture.

In other embodiments, the flexure device 400, 500, 600, and/or 700 includes multiple second portions 408, 608 coupled to the first portion 404, 604 via respective sets of flexure members. For example, one of the second portions 408, 608 is coupled to a top tube 324, and another one of the second portions 408, 608 is coupled to seat stays 328 that are not integral with the top tube 324. In at least some of such embodiments, the flexure device 400, 500, 600, and/or 700 permits the top tube 324 to move somewhat independently from the seat stays 328.

Referring again to FIGS. 1A, 1B, and 1C, in other embodiments, the flexure device 350 is configured to provide a substantially similar spring/damping characteristic in any of a plurality of orientations in which the flexure device 350 is configured to be inserted in the aperture of the seat tube 308.

As discussed above, in some embodiments, different flexure devices 350 are configured to (i) provide different spring/damping characteristics, (i) accommodate different rider weights, (iii) accommodate different riding requirements (e.g., climbing versus riding on flat terrain), etc., and thus a first flexure device 350 can be replaced with a second flexure device 350 to (i) provide different desired spring/damping characteristics, (i) accommodate a different rider weight, (iii) accommodate a new riding requirement, etc. For example, different ones of the flexure devices 400, 500, 600, and 700 can be employed in the same bicycle frame at different times. Similarly, in some embodiments, a single flexure device 350 is configured to (i) provide different spring/damping characteristics, (i) accommodate different rider weights, (iii) accommodate different riding requirements (e.g., climbing versus riding on flat terrain), etc., when mounted within the aperture of the seat tube 300 at different orientations. Thus, the orientation of a single flexure device 350 within the aperture of the seat tube 308 can be changed to (i) provide different desired spring/damping characteristics, (i) accommodate a different rider weight, (iii) accommodate a new riding requirement, etc. For example, the flexure device 400 can be mounted in the seat tube 308 at a first time so that the arrow 424 corresponds to vertical, whereas the flexure device 400 is mounted in the seat tube 308 at a second time so that the arrow 428 corresponds to vertical.

In embodiments in which the flexure device 350, 400, 500, 600, and/or 700 can be rotated within the aperture defined by the seat tube 308, a locking device such as a clamping device, a radial set-screw, a sliding pin, etc., is utilized to hold the flexure device 350, 400, 500, 600, and/or 700 in a desired orientation within the aperture. In some embodiments, a rider can alter spring/damping characteristics while riding by using the locking device to unlock the flexure device 350, 400, 500, 600, and/or 700, rotate the flexure device 350, 400, 500, 600, and/or 700 to a new orientation, and then using the locking device to relock the flexure device 350, 400, 500, 600, and/or 700.

In some embodiments, the locking device is electromechanically activated. For example, in an embodiment, a control system mounted to the frame 300 includes a controller, one or more sensors, and one or more actuators coupled to the locking device. The controller (having a processor and a memory that stores machine readable instructions) executes instructions that implements one or more control algorithms. The one or more control algorithms monitor one or more of pedal torque, force applied to both pedals (e.g., to detect a rider standing on the pedals), speed, gear, orientation of the frame (e.g., to detect inclination of the terrain), front wheel motion, etc., as sensed by the one or more sensors, and controls the one or more actuators to activate or deactivate locking device when appropriate.

Similarly, in some embodiments, the flexure device 350, 400, 500, 600, and/or 700 can be electromechanically rotated. For example, in an embodiment, a control system mounted to the frame 300 includes a controller, one or more sensors, and one or more actuators coupled to the flexure device 350, 400, 500, 600, and/or 700 and configured to cause the flexure device 350, 400, 500, 600, and/or 700 to rotate within the aperture of the seat tube 308. The controller (having a processor and a memory that stores machine readable instructions) executes instructions that implements one or more control algorithms. The one or more control algorithms monitor one or more of vibration, pedal torque, force applied to both pedals (e.g., to detect a rider standing on the pedals), speed, gear, orientation of the frame (e.g., to detect inclination of the terrain), front wheel motion, etc., as sensed by the one or more sensors, and controls the one or more actuators to rotate the flexure device 350, 400, 500, 600, and/or 700 when appropriate.

In some embodiments in which the flexure device 350, 400, 500, 600, and/or 700 cannot rotate while within the aperture, flexure elements of the flexure device 350, 400, 500, 600, and/or 700 include holes in which one or more movable stepped rods can be radially oriented at different positions to allow, inhibit, or prevent motion of or between the flexure elements of the flexure device 350, 400, 500, 600, and/or 700. Different positions of the movable stepped rods within the flexure device 350, 400, 500, 600, and/or 700 may alter the spring/damping characteristics of the flexure device 350, 400, 500, 600, and/or 700. In some embodiments, the one or more movable stepped rods are manually movable. In some embodiments, the one or more movable stepped rods are movable using an electromechanical mechanism and a controller such as described above.

In an embodiment, the aperture in the seat tube 308 is large enough to permit the flexure device 350, 400, 500, 600, and/or 700 to slide up (or down in another embodiment) within the aperture (when disconnected from the crossbar tube 332) to permit the flexure device 350, 400, 500, 600, and/or 700 to be removed or reoriented. In an embodiment, the flexure device 350, 400, 500, 600, and/or 700 may be held in an operating position (e.g., when connected to the crossbar tube 332) within the aperture using a suitable mechanism such as one or more pins, clamps, etc.

In another embodiment, the seat tube 308 comprises a top portion and a bottom portion, where the top portion and the bottom portion are removably connected at the aperture via bolts, clamps, or any other suitable coupling mechanism. The top portion can be removed from the bottom portion to permit insertion and removal of the flexure device 350, 400, 500, 600, and/or 700. In various embodiments, the bottom portion of the seat tube 308 is rigidly, pivotably, rotatably, flexibly, etc., connected to the bottom bracket 312.

In another embodiment, the seat tube 308 comprises a first portion and a second portion, where the second portion is removably connected to the first portion above and below the aperture via bolts, clamps, or any other suitable coupling mechanism. The second portion can be removed from the first portion to permit insertion and removal of the flexure device 350, 400, 500, 600, and/or 700. In various embodiments, the first portion of the seat tube 308 is rigidly, pivotably, rotatably, flexibly, etc., connected to the bottom bracket 312.

In other embodiments, the crossbar tube 332 defines an aperture within which the flexure device 350, 400, 500, 600, and/or 700 is mounted, in manners similar to those discussed above. In various embodiments, the seat tube 308 is forked and forms two fork portions at least at the intersection with the crossbar tube 332, and each fork portion is connected to the flexure device 350, 400, 500, 600, and/or 700 in manners similar to those discussed above.

In some embodiments, the flexure device 350, 400, 500, 600, and/or 700 may have non-linear spring and/or damping characteristics with respect to the amount of deflection of the crossbar tube 332 with respect to the seat tube 308.

In an embodiment, a first end of the seat tube 308 is attached to the bottom bracket shell 312 by welding, brazing, bonding, or any other suitable technique. In another embodiment, the first end of the seat tube 308 is flexibly, pivotably, rotatably, etc., attached to the bottom bracket shell 312 via a pin mechanism, a hinge mechanism, a bearing, a flexible coupling device, or some other suitable technique. In at least some embodiments in which the seat tube 308 is flexibly, pivotably, rotatably, etc., connected (e.g., via a pin, a hinge, a bearing, etc.), greater movement of seat tube 308 with respect to the bottom bracket 312 due to the flexible/pivotal/rotatable connection may act to allow greater deflection of the crossbar tube 332 when the wheels of the bicycle hit a bump, and thus allow the flexure device 350 to control this motion rather than have spring energy stored in deflecting the seat tube (which, if not allowed to rotate acts like a cantilever spring attached at the bottom bracket, in some embodiments).

Although in the embodiments above the top tube 324 is integral with the seat stays 328, in other embodiments, the top tube 324 is not integral with the seat stays 328. For example, in one embodiment, a flexure device similar to the flexure device 350, 400, 500, 600, and/or 700 includes a third portion similar to the second portion 408, 608, the third portion flexibly coupled to the first portion 404, 604 via a plurality of flexure members. In an embodiment, the third portion attaches to the seat stays 328 and the second portion 408, 608 attaches to the top tube 324. In some embodiments, the flexure device permits motion of the top tube 324 with respect to the seat stays 328.

In another embodiment, the flexure device 350, 400, 500, 600, and/or 700 flexibly couples the seat stays 328 to the seat tube 308 and a second flexure device, the same as or similar to the flexure device 350, 400, 500, 600, and/or 700, flexibly couples the top tube 324 to the seat tube 308, wherein the second flexure device is mounted within a second aperture defined by the seat tube 308.

In another embodiment, the flexure device 350, 400, 500, 600, and/or 700 flexibly couples the top tube 324 to the seat tube 308 and a second flexure device, the same as or similar to the flexure device 350, 400, 500, 600, and/or 700, flexibly couples the seat stays 328 to the top tube 324, wherein the second flexure device is mounted within an aperture defined by the top tube 324.

In another embodiment, the top tube 324 attaches to the second portion 408, 608 of the flexure device 350, 400, 500, 600, and/or 700, and the seat stays 328 are flexibly attached to the top tube 324 via one or more bearings, bolts, etc., that permit the seat stays 328 to pivot with respect to the top tube 324, and vice versa, at a junction of the seat stays 328 and the top tube 324. Similarly, in another embodiment, the seat stays 328 attach to the second portion 408, 608 of the flexure device 350, 400, 500, 600, and/or 700, and the top tube 324 is flexibly attached to the seat stays 328 via one or more bearings, bolts, etc., that permit the seat stays 328 to pivot with respect to the top tube 324, and vice versa, at a junction of the seat stays 328 and the top tube 324.

In some embodiments, the crossbar tube 332 defines two or more apertures on a forked portion of the crossbar tube 332 generally at points of intersection with the flexure device 350, 400, 500, 600, and/or 700 and on inner surfaces generally adjacent to the flexure device 350, 400, 500, 600, and/or 700. In some embodiments, the flexure device 350, 400, 500, 600, and/or 700 includes two or more corresponding raised portions configured to fit within the two or more apertures defined by the crossbar tube 332. The apertures and raised portions may be splined or have a polygonal shape to inhibit rotational movement of the crossbar tube 332 with respect to the seat tube 308, in some embodiments.

Figure 6A:
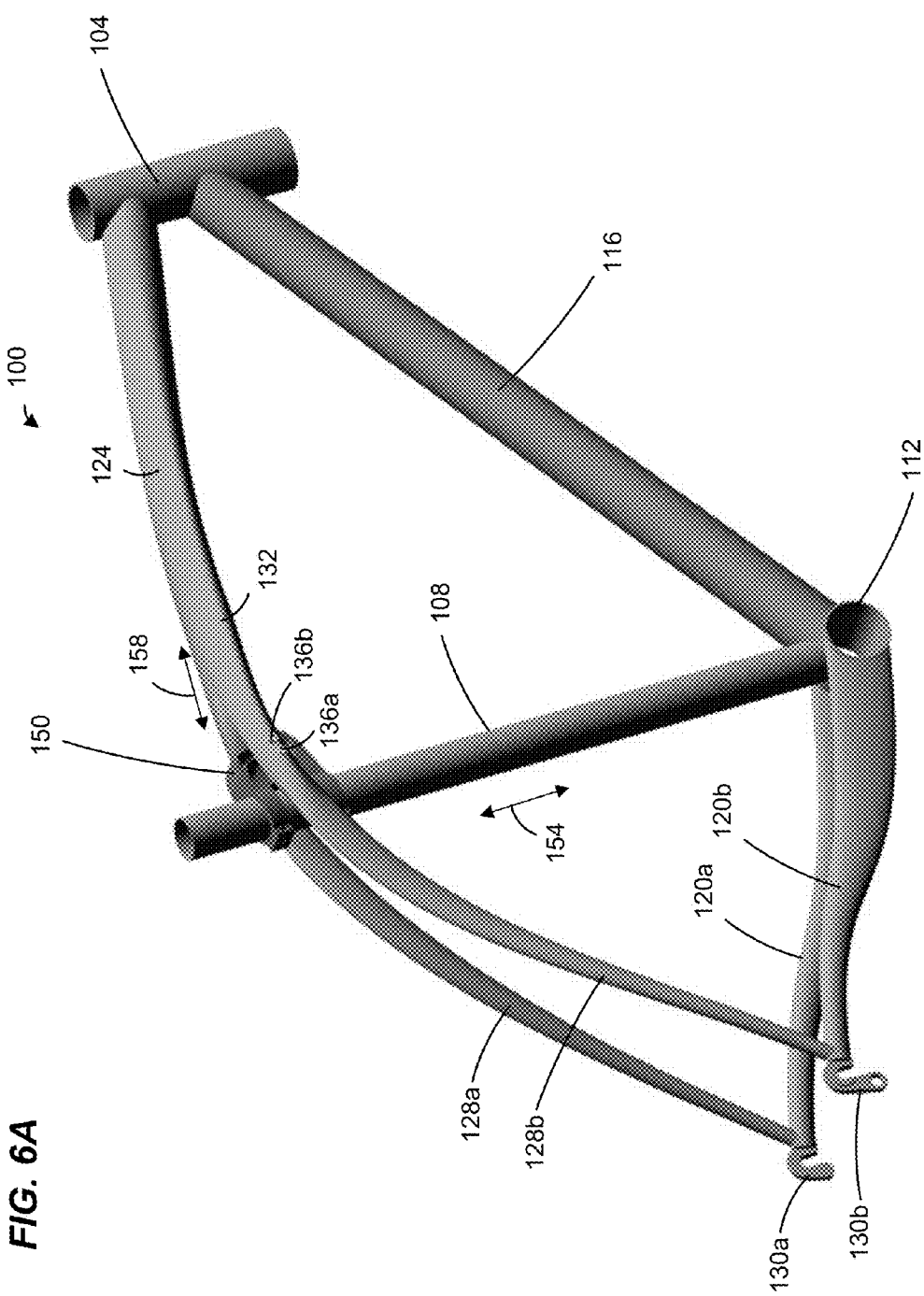
FIG. 6A is a diagram of a bicycle frame, according to an embodiment.

FIG. 6A is a diagram of a bicycle frame 100, according to another embodiment. The frame 100 includes a head tube 104, a seat tube 108, a bottom bracket shell 112, a down tube 116, chain stays 120, a top tube 124, and seat stays 128. The top tube 124 is integral with the seat stays 128 to form an integral crossbar tube 132. An end of the top tube 124 is attached to the head tube 104 by welding, brazing, bonding, or any other suitable technique. A first end of the down tube 116 is attached to the head tube by welding, brazing, bonding, or any other suitable technique. A second end of the down tube 116 is attached to the bottom bracket shell 112 by welding, brazing, bonding, or any other suitable technique.

A first end of the seat tube 108 is rigidly attached to the bottom bracket shell 112 by welding, brazing, bonding, or any other suitable technique. In another embodiment, the first end of the seat tube 108 is flexibly attached to the bottom bracket shell 112 via a bearing, a coupling device similar to the coupling device 150 described below, or some other suitable technique.

Respective first ends of the chain stays 120 are attached to the bottom bracket shell 112 by welding, brazing, bonding, or any other suitable technique. Respective second ends of the chain stays 120 are attached to respective ends of the seat stays 128 by welding, brazing, bonding, or any other suitable technique. At or proximate to the junctions of the respective second ends of the chain stays 120 with the respective ends of the seat stays 128, respective brackets 130 may be attached to (by welding, brazing, bonding, or any other suitable technique) or integrally formed with the respective second ends of the chain stays 120 and/or the respective ends of the seat stays 128. The brackets 130 are configured to receive an axle of a rear wheel.

A coupling device 150 is attached to the seat tube 108 proximate to a second end of the seat tube 108. The coupling device 150 is also attached, via bolts 136, to the crossbar tube 132 proximate to a junction of the top tube 124 with the seat stays 128.

The head tube 104, the seat tube 108, the bottom bracket shell 112, the down tube 116, the chain stays 120, the seat stays 128, and the crossbar tube 132 each may comprise a suitable material such as steel, aluminum alloy, titanium, carbon fiber, etc.

Figure 6B:
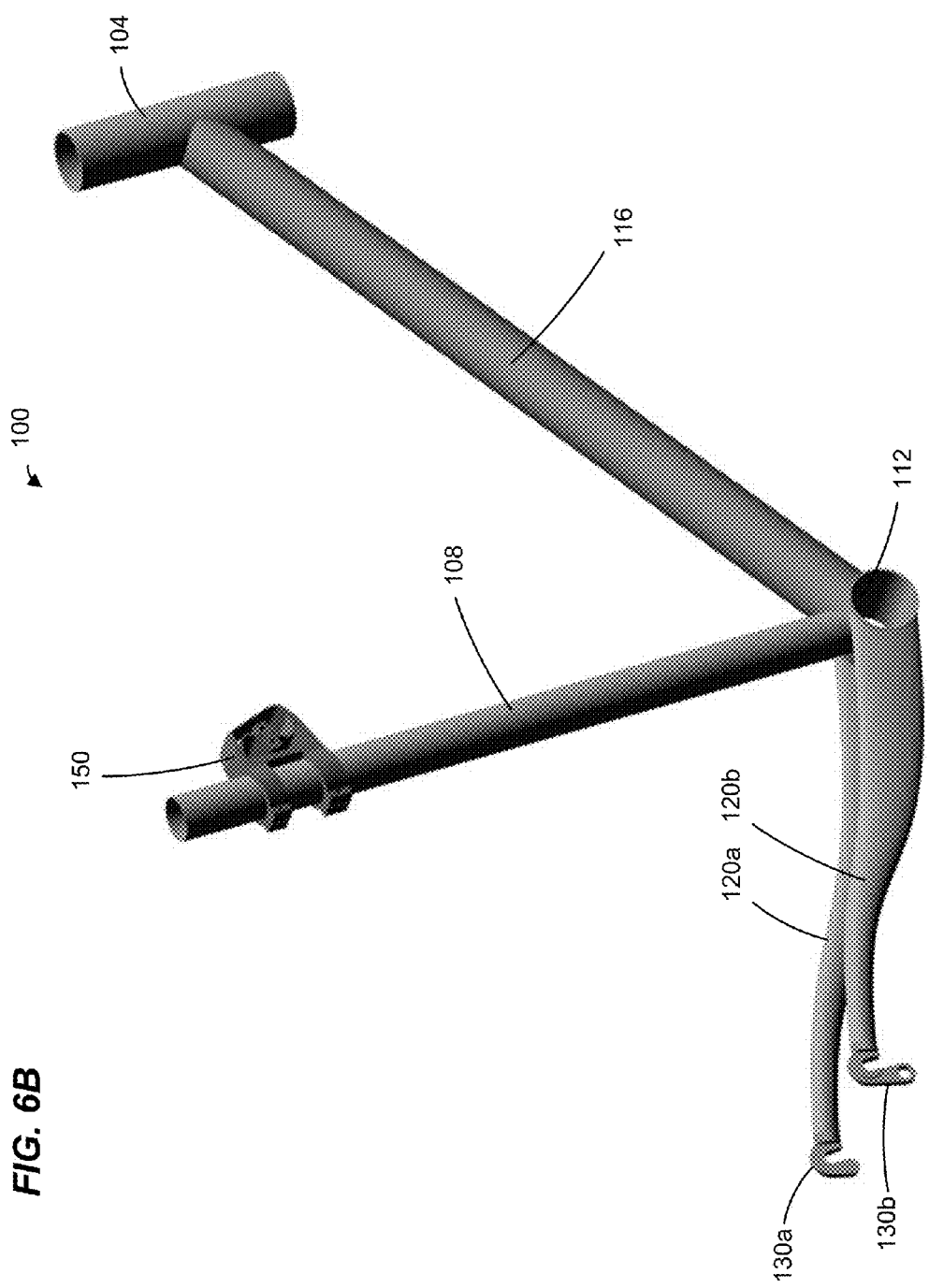
FIG. 6B is a diagram of the bicycle frame of FIG. 6A, with a top tube and seat stays removed to show more clearly a coupling device utilized in bicycle frame of FIG. 6A, according to an embodiment.
Figure 7A:
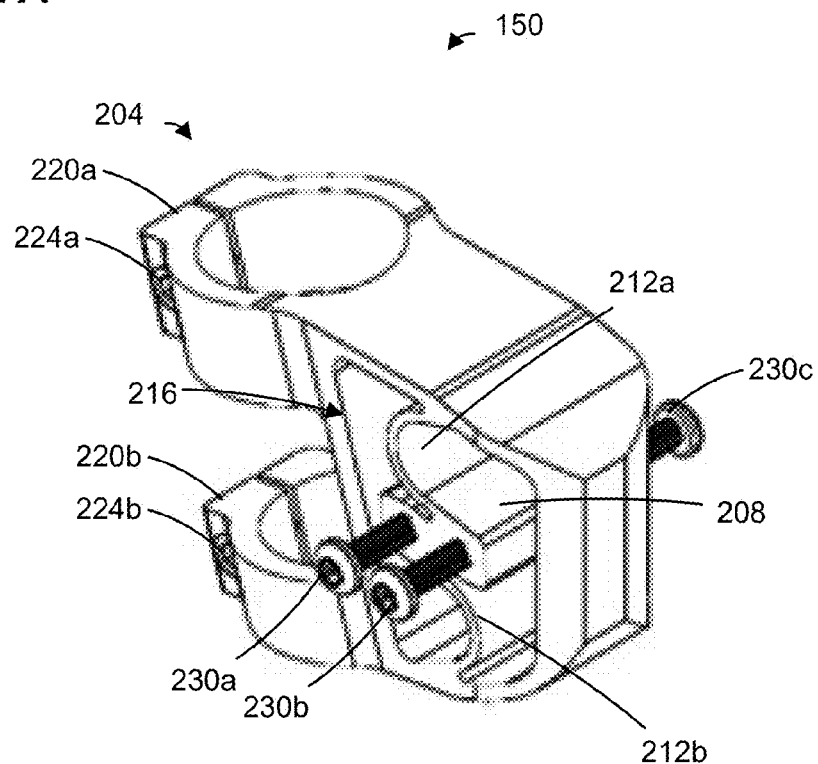
FIG. 7A is an isometric view of a coupling device, according to an embodiment.
Figure 7B:
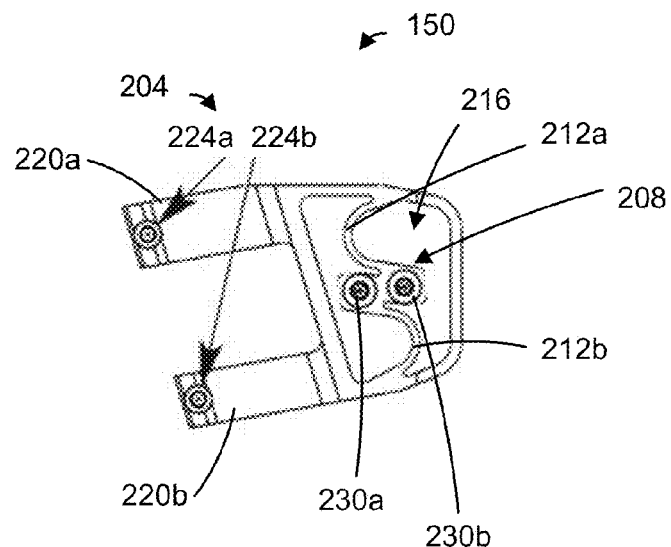
FIG. 7B is a side view of the coupling device of FIG. 7A.
Figure 7C:
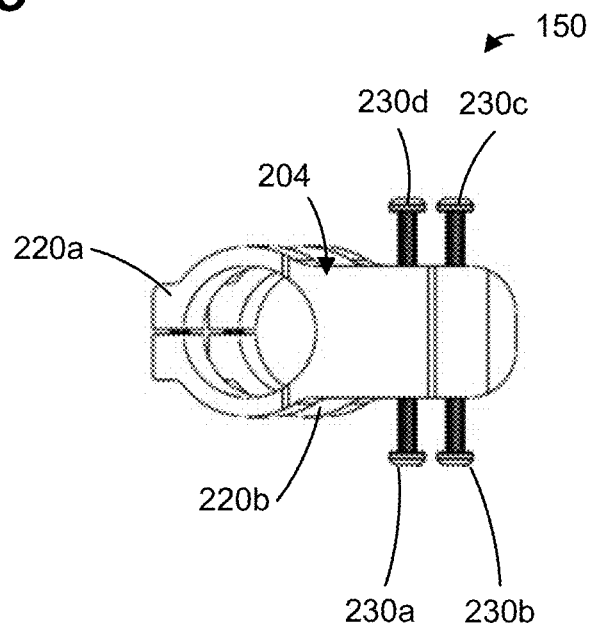
FIG. 7C is a top view of the coupling device of FIGS. 7A and 7B.
Figure 7D:
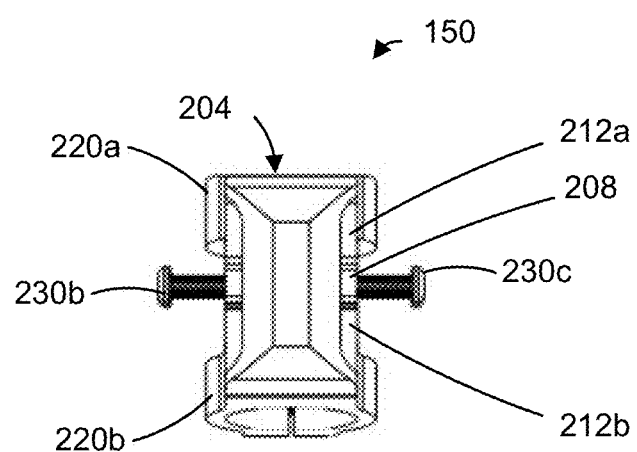
FIG. 7D is a front view of the coupling device of FIGS. 7A, 7B and 7C.

FIG. 6B is a diagram of the frame 100 with the top tube 124 and seat stays 128 hidden to better illustrate the coupling device 150.

The coupling device 150 is a flexure device, in an embodiment. The flexure device 150 is described in more detail below. The flexure device 150 is configured to couple the crossbar tube 132 to the seat tube 108, and to be more rigid with respect to relative movement of the crossbar tube 132 with respect to the top tube 108 in some directions, but more flexible with to relative movement of the crossbar tube 132 with respect to the top tube 108 in other directions. In particular, the flexure device 150 is more rigid with respect to movement of the crossbar tube 132 in a direction perpendicular to a plane passing through a lateral axis of the top tube 124 and a lateral axis of the seat tube 108, and/or is more rigid with respect to (i) torsional movement of the crossbar tube 132, with respect to the seat tube 108, about the lateral axis of the top tube 108, as compared to flexibility with respect to vertical movement of the top tube 124 and/or the seat stays 128 in a direction generally parallel to a lateral axis (e.g., a centerline) of the seat tube 108.

The flexure device 150 is configured to permit the crossbar tube 132 to move, relative to the seat tube 108, in a direction (indicated in FIG. 6A by the arrows 154) parallel to the lateral axis of the seat tube 108. Additionally, the flexure device 150 is configured to permit the crossbar tube 132 to move, relative to the seat tube 108, in a direction (indicated in FIG. 6A by the arrows 158) perpendicular to the lateral axis of the seat tube 108 and generally parallel to the lateral axis of the top tube 124.

Further, the flexure device 150, because of the flexibility in certain directions described above, allows the bicycle frame 100 to flex (e.g., compress and expand) vertically, in a trapezoidal fashion, and thus permit the frame 100 to absorb road shock. For example, the flexure device 150 permits a trapezoid generally formed by the top tube 124, the down tube 116, the chain stays 120, and the seat stays 128, to compress and expand in a direction (indicated in FIG. 6A by the arrows 154) parallel to the lateral axis of the seat tube 108.

In some embodiments, the coupling device 150 additionally or alternatively facilitates mass damping when the rider is seated. In particular, in such embodiments, vibrations within a frequency range are significantly absorbed by the coupling device 150 when the rider is seated. In some embodiments, damping is provided by the coupling device 150 via a damping mechanism and/or material integral with the coupling device 150. In some embodiments, the bike frame 100 also provides damping.

In some embodiments, the frame can be approximately modeled as a first leaf spring, comprising the top tube 124 and the seat stays 128 (or the crossbar tube 132), coupled to a second leaf spring comprising the down tube 116 and the chain stays 120. The seat tube 108 and coupling device 150 couple the first leaf spring and the second leaf spring together approximately at portions of the first leaf spring and the second leaf spring generally corresponding to maximum bowing and/or deflection between the first leaf spring and the second leaf spring, and the coupling device 150 acts as a spring and/or damper. The first leaf spring and the second leaf spring can flex toward one another and release away from one another, with the coupling device 150 acting as a spring (along with the frame 100) and/or acting to dampen the motion of the portion of the first leaf spring coupled to the seat tube 108 with respect to the portion of the second leaf spring coupled to the seat tube 108 (and augmenting damping provided by the frame 100).

The flexure device 150 is attached to the seat tube 108 proximate to the second end of the seat tube 108. In an embodiment, the flexure device 150 is removably clamped to the seat tube 108 via bolts 136, screws, etc. (not shown in FIG. 6B). This permits the flexure device 150 to be easily replaced with other differently configured flexure devices 150 that are designed for different rider weights, road conditions, etc. In other embodiments, the flexure device 150 is more permanently attached to the seat tube 108, such as by welding, brazing, bonding, etc., the flexure device 150 to the seat tube 108. In other embodiments, the flexure device 150 is integrated with the seat tube 108 to form an integral unit.

FIGS. 7A-D are an isometric view, a side view, a top view, and a front view, respectively, of the flexure device 150 of FIGS. 6A and 6B, according to an embodiment. The flexure device 150 includes a first portion 204 configured to attach to the seat tube 108, and a second portion 208 configured to attach to the crossbar tube 132. The first portion 204 is flexibly coupled to the second portion 208 via a plurality of flexure members 212. Although flexure members 212 are illustrated, other suitable numbers of flexure members 212 may be utilized in other embodiments. For example, in one embodiment, the flexure device 150 includes three flexure members 212. In another embodiment, the flexure device 150 includes four flexure members 212. In other embodiments, the flexure device 150 includes five, six, seven, etc., flexure members 212. In other embodiments, flexure members having different shapes, such as the flexure members of FIGS. 205, are utilized.

The first portion 204 forms an opening 216 and the second portion 208 is located within the opening 208. In particular, the plurality of flexure members 212 flexibly couple the first portion 204 to the second portion 208 so that the second portion 208 is located within the opening 216. Each of the flexure members 212 has a C shape. In other embodiments, each of the flexure members 212 has another suitable shape. In some embodiments, all of the flexure members 212 have the same shape. In some other embodiments, the flexure members 212 have two or more different shapes.

The first portion 204 has one or more clamp portions 220 for attaching the flexure device 150 to the seat tube 108. Although two clamp portions 220 are illustrated, other suitable numbers of clamp portions 220 may be utilized in other embodiments. For example, in one embodiment, the flexure device 150 includes a single clamp portion 220. In another embodiment, the flexure device 150 includes three clamp portions 220. In other embodiments, the flexure device 150 includes four, five, six, etc., clamp portions 220. Each clamp portion 220 includes at least one respective aperture to receive at least one respective clamp bolt 224. The clamp bolts 224 are utilized to tighten the clamp portions 220 on the seat tube 108. Although one clamp bolt 224 for each clamp portion 220 is illustrated, other suitable numbers of clamp bolts 224 per each clamp portion 220 may be utilized in other embodiments.

The second portion 208 has four threaded apertures for receiving four bolts 230. The bolts 230 are utilized to attach the second portion 208 to the crossbar tube 132. In particular, the seat stay 128b (FIG. 6A) includes two apertures (not shown) to receive the bolts 230a and 230b, and the seat stay 128a (FIG. 6A) includes two apertures (not shown) to receive the bolts 230c and 230d. Although two bolts 230 per seat stay 128 are illustrated, other suitable numbers of bolts 230 per seat stay 128 may be utilized in other embodiments. For example, in one embodiment, the flexure device 150 includes a single bolt 230 per seat stay. In another embodiment, the flexure device 150 includes three bolts 230 per seat stay. In other embodiments, the flexure device 150 includes four, five, six, etc., bolts 230 per seat stay.

In other embodiments, the first portion 204 and the second portion 208 are coupled together in a manner similar to the flexure devices illustrated in Figs.

The flexure device 150 may comprise steel, stainless steel, titanium, a fiber-reinforced composite, etc., or any other suitable material, in various embodiments. The flexure device 150 may have elastomeric dampening material co-molded, bonded or inserted into the appropriate areas of the flexure device 150 to further dampen vibrations, in some embodiments.

Although in the embodiments above the top tube 124 is integral with the seat stays 128, in other embodiments, the top tube 124 is not integral with the seat stays 128. For example, in one embodiment, a flexure device similar to the flexure device 150 includes a third portion similar to the second portion 208, the third portion flexibly coupled to the first portion 204 via a plurality of flexure members. In an embodiment, the third portion attaches to the seat stays 128 and the second portion 208 attaches to the top tube 124.

In another embodiment, the flexure device 150 flexibly couples the seat stays 128 to the seat tube 108 and a second flexure device, the same as or similar to the flexure device 150, flexibly couples the top tube 124 to the seat tube 108.

In another embodiment, the top tube 124 attaches to the second portion 208 of the flexure device 150, and the seat stays 128 are flexibly attached to the top tube 124 via one or more bearings, bolts, etc., that permit the seat stays 128 to pivot with respect to the top tube 124, and vice versa, at a junction of the seat stays 128 and the top tube 124. Similarly, in another embodiment, the seat stays 128 attach to the second portion 208 of the flexure device 150, and the top tube 124 is flexibly attached to the seat stays 128 via one or more bearings, bolts, etc., that permit the seat stays 128 to pivot with respect to the top tube 124, and vice versa, at a junction of the seat stays 128 and the top tube 124.

In another embodiment, the first end of the seat tube 108 is flexibly, pivotably, or rotatably attached to the bottom bracket shell 112 via a pin mechanism, a hinge mechanism, a bearing, a flexible coupling device, or some other suitable technique. In at least some embodiments in which the seat tube 108 is flexibly, pivotably, or rotatably connected (e.g., via a pin, a hinge, a bearing, etc.), greater movement of seat tube 108 with respect to the bottom bracket 112 due to the flexible/pivotal/rotatable connection may act to allow greater deflection of the crossbar tube 132 when the wheels of the bicycle hit a bump, and thus allow the flexure device 150 to control this motion rather than have spring energy stored in deflecting the seat tube (which, if not allowed to rotate acts like a cantilever spring attached at the bottom bracket, in some embodiments).

In the various embodiments described above, the flexure device 150, 350, 400, 500, 600, and/or 700 is replaced with another suitable coupling device that employs spring members, compressed air springs, a shock absorber filled with a gas or a suitable liquid such as an oil, a magnetorheological liquid. etc.

In some embodiments, increased compliance of the bicycle frame is desirable in at least some situations and this may involve the crossbar tube 132/332 to move fore and aft relative to the seat tube 108/308 in addition to vertically. In some embodiments, a second flexure at the intersection of the crossbar tube 132/332 and the seat tube 108/308 head tube is employed, such as described above. In other embodiments, a "double-acting" flexure device 150, 350, 400, 500, 600, 700 is configured to connect independently to separate seat stays 128/328 and top tubes 124/324, rather than utilizing an integrated cross tube 132/332.

In some embodiments, the crossbar tube 132/332 is coupled to the head tube 104/304 via a flexible/pivotal/rotatable connection mechanism, or the crossbar tube 132/332 is rigidly connected to the head tube 104/304 but the head tube 104/304 is connected to the down tube 116/316 via a flexible/pivotal/rotatable connection mechanism. Additionally or alternatively, the crossbar tube 132/332 is coupled to the chain stays 120/320 and/or the brackets 330 via respective flexible/pivotal/rotatable connection mechanism. In some embodiments, such flexible/pivotal/rotatable connections may allow greater deflection of the crossbar tube 132/332 when the wheels of the bicycle hit a bump, and thus allow the flexure device 150, 350, 400, 500, 600, 700 to control this motion rather than have spring energy stored in the frame 100/300 itself.

In some embodiments, the down tube 116/316 is omitted and the crossbar tube 132/332 is strengthened and/or straitened to accommodate for the omitted down tube 116/316.

Coupling devices such as described above may be utilized in combination with one or more existing or later developed bicycle suspension technologies. In some embodiments, use of one or more flexure devices such as described above may permit use of a front-wheel spring/damper unit (e.g., shocks) that is smaller and/or lighter while achieving similar performance with respect to a prior art bicycle.

A bicycle incorporating a frame and coupling device such as describe above will comprise a front wheel, a rear wheel, handlebars, a fork, and one or more of brakes, derailleurs, a chain, chain rings, a cog set, pedals, crank arms, a seat post, a saddle, cables, etc.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. An apparatus, comprising:
   a bicycle frame having a seat tube, seat stays, and a top tube, the top tube being integral with the seat stays to form a crossbar tube; and
   a coupling device that flexibly and directly couples the top tube to the seat tube such that the top tube can be displaced at least in a vertical direction with respect to the seat tube.

2. The apparatus of claim 1, wherein the coupling device flexibly couples the seat stays of the bicycle frame to the seat tube.

3. The apparatus of claim 1, wherein the coupling device comprises:
a first portion attached to the seat tube;
a second portion attached to the top tube; and
a plurality of first members that flexibly couple the first portion to the second portion.

4. The apparatus of claim 3, wherein:
the bicycle frame comprises seat stays; and
the coupling device further comprises:
a third portion attached to the seat stays, and
a plurality of second members that flexibly couple the third portion to the second portion.

5. The apparatus of claim 4, wherein:
the coupling device is a flexure device;
the plurality of first members comprise a plurality of first flexure members; and
the plurality of second members comprise a plurality of second flexure members.

6. The apparatus of claim 1, wherein:
the coupling device flexibly couples the crossbar tube to the seat tube.

7. The apparatus of claim 1, wherein the coupling device comprises a flexure device.

8. The apparatus of claim 7, wherein the flexure device comprises:
a first portion mounted to the seat tube;
a second portion mounted to the seat stays; and
a plurality of first flexure members to flexibly couple the first portion to the second portion.

9. The apparatus of claim 8, wherein the plurality of first flexure members is integral with the first portion and the second portion.

10. The apparatus of claim 8, wherein:
the first portion of the flexure device forms an opening; and
the plurality of first flexure members flexibly couple the second portion of the flexure device to the first portion of the flexure device so that the second portion of the flexure device is located within the opening.

11. The apparatus of claim 1, wherein the coupling device is mounted within an aperture of the seat tube.

12. A bicycle comprising the apparatus of claim 1.

13. An apparatus, comprising:
a coupling device configured to be mounted to one of (i) a seat tube or (ii) a top tube of a bicycle frame, and configured to flexibly couple the top tube of the bicycle frame to the seat tube such that the top tube can be displaced at least in a vertical direction along a lateral axis of the seat tube.

14. The apparatus of claim 13, wherein the coupling device is configured to permit the top tube to move, relative to the seat tube, in a direction perpendicular to a lateral axis of the seat tube and parallel to a lateral axis of the top tube.

15. The apparatus of claim 13, wherein the coupling device is configured to permit the top tube to move, relative to the seat tube, in a direction parallel to a lateral axis of the seat tube.

16. The apparatus of claim 13, wherein the coupling device is configured to inhibit movement of the top tube in a direction perpendicular to a plane passing through a direction perpendicular to a lateral axis of the seat tube and parallel to a lateral axis of the top tube and a direction parallel to the lateral axis of the seat tube.

17. The apparatus of claim 13, wherein the coupling device is configured to inhibit torsional movement of the top tube, with respect to the seat tube, about an axis extending along a direction perpendicular to the lateral axis of the seat tube and parallel to a lateral axis of the top tube.

18. The apparatus of claim 13, wherein the bicycle frame further comprises a down tube, seat stays, and chain stays, the top tube, the down tube, the chain stays and the seat stays together forming a structural shape of the bicycle frame, and wherein the coupling device is configured to permit the structural shape of the bicycle frame to compress and expand in a direction along a lateral axis of the seat tube.

19. The apparatus of claim 13, wherein the coupling device is configured to flexibly couple seat stays of the bicycle frame to the seat tube.

20. The apparatus of claim 13, wherein the coupling device comprises:
a first portion configured to attach to the seat tube;
a second portion configured to attach to the top tube; and
a plurality of first members that flexibly couple the first portion to the second portion.

21. The apparatus of claim 20, wherein the coupling device further comprises:
a third portion configured to attach to seat stays of the bicycle frame; and
a plurality of second members that flexibly couple the third portion to the second portion.

22. The apparatus of claim 21, wherein:
the coupling device is a flexure device;
the plurality of first members comprise a plurality of first flexure members; and
the plurality of second members comprise a plurality of second flexure members.

23. The apparatus of claim 13, wherein the coupling device is configured to attach to a crossbar tube that integrates the top tube with seat stays of the bicycle frame.

24. The apparatus of claim 13, wherein the coupling device comprises a flexure device.

25. An apparatus, comprising:
a bicycle frame having a seat tube, a top tube, and seat stays, the top tube being integral with the seat stays to form a crossbar tube;
a coupling device that flexibly couples the top tube to the seat tube such that the top tube can be displaced at least in a vertical direction with respect to the seat tube; and
wherein the coupling device flexibly and directly couples the crossbar tube to the seat tube.

26. An apparatus, comprising:
a bicycle frame having a seat tube, a top tube, and seat stays;
a coupling device that flexibly and directly couples the top tube to the seat tube such that the top tube can be displaced at least in a vertical direction with respect to the seat tube, wherein the coupling device includes
a first portion mounted to the seat tube;
a second portion mounted to the seat stays; and
a plurality of first flexure members to flexibly couple the first portion to the second portion.

27. The apparatus of claim 26, wherein the plurality of first flexure members is integral with the first portion and the second portion.

28. The apparatus of claim 26, wherein:
the first portion of the flexure device forms an opening; and
the plurality of first flexure members flexibly couple the second portion of the flexure device to the first portion of the flexure device so that the second portion of the flexure device is located within the opening.

29. An apparatus, comprising:
a coupling device configured to be mounted to one of (i) a seat tube or (ii) a top tube of a bicycle frame, the bicycle frame comprising a down tube, seat stays, and chain stays, the coupling device configured to flexibly couple the top tube of the bicycle frame to the seat tube such that the top tube can be displaced at least in a vertical direction along a lateral axis of the seat tube;
wherein the to tube, the down, tube, the chain stays, and the seat stays together form a structural shape of the bicycle frame; and
wherein the coupling device is configured to permit the structural shape of the bicycle frame to compress and expand in a direction along a lateral axis of the seat tube.

30. An apparatus, comprising:
a bicycle frame having a seat tube, a top tube, and seat stays;
a coupling device that flexibly couples the top tube to the seat tube such that the top tube can be displaced at least in a vertical direction with respect to the seat tube, wherein the coupling device includes
a first portion mounted to the seat tube and forming an opening;
a second portion mounted to the seat stays;
a plurality of first flexure members that flexibly couple the first portion and the second portion so that the second portion of the flexure device is located within the opening.

* * * * *

UNITED STATES PATENT AND TRADEMARK OFFICE
CERTIFICATE OF CORRECTION

PATENT NO. : 9,604,690 B2  
APPLICATION NO. : 14/216572  
DATED : March 28, 2017  
INVENTOR(S) : Chris Huber et al.

Page 1 of 1

It is certified that error appears in the above-identified patent and that said Letters Patent is hereby corrected as shown below:

In the Claims

At Column 19, Line 9, "to tube," should be -- top tube, --.

At Column 19, Line 9, "down, tube," should be -- down tube, --.

Signed and Sealed this  
Tenth Day of October, 2017

Joseph Matal  
*Performing the Functions and Duties of the*  
*Under Secretary of Commerce for Intellectual Property and*  
*Director of the United States Patent and Trademark Office*